W. ECKELBERG.
COMBINED FEED AND HAY RACK.
APPLICATION FILED FEB. 5, 1913.
1,084,930. Patented Jan. 20, 1914.
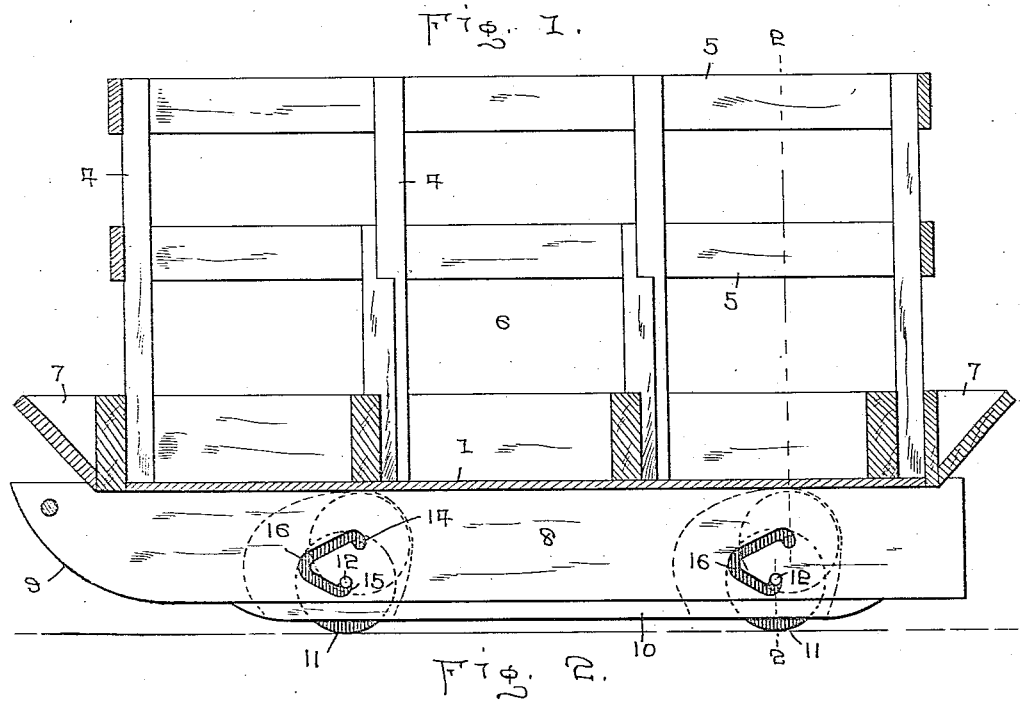
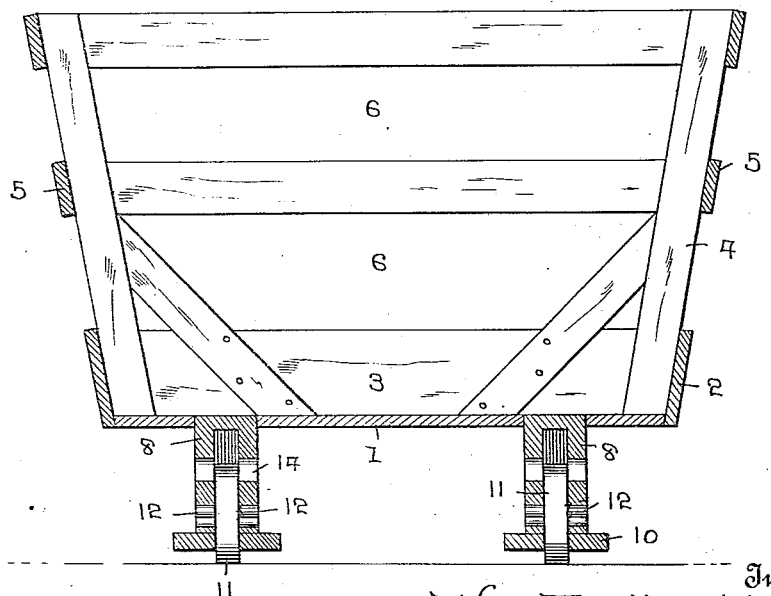

UNITED STATES PATENT OFFICE.

WILLIAM ECKELBERG, OF GETTYSBURG, SOUTH DAKOTA.

COMBINED FEED AND HAY RACK.

1,084,930.  Specification of Letters Patent.  Patented Jan. 20, 1914.

Application filed February 5, 1913. Serial No. 746,377.

*To all whom it may concern:*

Be it known that I, WILLIAM ECKELBERG, a citizen of the United States, residing at Gettysburg, in the county of Potter and State of South Dakota, have invented certain new and useful Improvements in Combined Feed and Hay Racks; and I do hereby declare the following to be a full, clear, and exact description of the invention, such as will enable others skilled in the art to which it appertains to make and use the same.

My invention relates to what may be properly designated as a combination feeding rack, box, or hay rack for carrying and feeding all kinds of food for live stock, and it consists of certain novel features of construction, and combination of parts, the preferred form whereof will be hereinafter clearly set forth in the following specifications and in the accompanying drawings.

The prime object of my invention is to provide means whereby the load of hay, or other stock food contained in my improved receptacle, may be readily drawn from place to place and left in the field, or other desired place, and when emptied of its contents, incident to feeding the live stock, it may be quickly returned to the barn or other source of supply for filling and as readily drawn to the field again, or other feeding point.

Other objects and advantages will be hereinafter made clearly apparent, reference being had to the accompanying drawings, in which—

Figure 1 shows a central longitudinal sectional view of my portable feeding rack, while, Fig. 2 shows a transverse sectional view thereof on line 2—2 of Fig. 1.

In order to conveniently refer to the various parts of my invention and coöperating elements, numerals will be employed, the same numeral applying to similar parts throughout the views. In materializing my invention I provide a base proper 1, which is box-like in form and is provided with the side and end walls 2 and 3 respectively, thus rendering the base member grain tight, thereby insuring against waste. Upon the base, thus or otherwise constructed, I provide a plurality of standards 4, there being as many standards as may be deemed advisable, and said standards have secured thereto horizontal bars 5, which may be multiplied in number to meet the requirements and prevent the hay, fodder, or the like from falling through the spaces left between said bars, it being understood that said spaces or openings, indicated by the numeral 6, are for the purpose of rendering the contents of my improved rack, readily accessible to the live stock.

At each end of the base member I provide a trough-like member 7 in which grain, bran or other substances may be placed, it being understood that said troughs may be provided with a suitable closure, if deemed desirable.

Beneath the base member I firmly secure a pair of carrying runners 8, which may be formed in any suitable manner, preferably with one or both ends rounded, as indicated by the numeral 9, whereby the runners may be readily drawn over the ground in either direction. I also reinforce the runners with the tread or base plates 10, which will insure prolongation of the usefulness thereof, it being understood that in some instances I make the base members 10 of greater width than the runners, so as to insure suitable tread and also prevent the runners from settling too deeply into the surface of the ground. In some instances I also provide a pair of carrying wheels for each runner, indicated by the numeral 11, said carrying wheels each having a suitable journal 12, the said journal passing through the wheel and being rigidly secured thereto and each end of the journal being designed to be received by suitable seats 14 and 15. The seat 15 is in connection with the seat 14 by means of the slot or opening 16, and when the journals 12 are in the seat 15, the wheels are in position to carry the load, but when the journals 12 are in the seat 14, the wheels are lifted upward in suitable spaces provided in the runners and do not contact with the ground. By this means I am enabled to provide suitable carrying wheels for my feeding rack, as in that season of the year when there is no snow upon the ground, and at the same time the wheels may be readily moved upward into position which will place them entirely out of contact with the surface of the ground when the season for using sleds has returned.

While I have described the use of the carrying wheels disposed within the runners, I reserve the right to make my carrying rack with or without the runners, as I may deem most desirable in practice. I do not therefore confine myself strictly o either form of construction, inasmuch as the simplest form of carrying runners may be employed.

It will be seen that my improved feeding and hay rack will be found very desirable and useful in supplying various kinds of live stock with food and that, by means of the grain-tight bottom or base member, a great saving is assured, since no loss can occur by the grain dropping upon the ground and being trampled under foot.

Obviously my improved hay and feeding rack will be found very desirable for use as a hay rack in holding wheat, oats, or the like, inasmuch as the runners are so placed that they may be placed between the standards of an ordinary wagon, whereby the forward and rear ends of the runners will rest upon the bolsters, as the tread plate 10 will not be of sufficient length to reach said bolsters. It follows that any wear upon the runners, incident to contact with the bolsters, will be upon the forward and rear ends of the runners and not upon the tread plate 10.

Obviously my hay rack will be specially desirable in holding wheat or other substances where the grain might become shattered, inasmuch as the base member 1 will prevent loss of the shattered grain.

While I have described the preferred construction and combination of parts, I wish to include all modifications or substantial equivalents as fall fairly within the scope of my invention, and having thus described my invention, further description is deemed unnecessary.

What I claim as new is:

1. The combination with a body, of supporting runners provided with bearing seats one above the other, said seats being connected by V-shaped slots, and wheels mounted upon axles journaled in said slots and adjustable from one seat to the other by way of said slots.

2. The combination with a body, of supporting runners provided with V-shaped slots diverging rearwardly, the upper ends turned downwardly and the lower ends turned upwardly to form bearing seats, and wheels mounted on axles journaled in said slots and adjustable from one seat to the other by way of the slots.

In testimony whereof I have signed my name to this specification in the presence of two subscribing witnesses.

WILLIAM ECKELBERG.

Witnesses:
 JAS. R. MCGEE,
 D. L. BACON.